(12) United States Patent
Swarup et al.

(10) Patent No.: US 9,149,835 B2
(45) Date of Patent: Oct. 6, 2015

(54) METHODS FOR REPAIRING DEFECTS IN AUTOMOTIVE COATINGS

(71) Applicant: PPG INDUSTRIES OHIO, INC., Cleveland, OH (US)

(72) Inventors: Shanti Swarup, Allison Park, PA (US); Xiangling Xu, Pittsburgh, PA (US); Richard J. Sadvary, Allison Park, PA (US); Anthony M. Chasser, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 297 days.

(21) Appl. No.: 13/780,442

(22) Filed: Feb. 28, 2013

(65) Prior Publication Data

US 2014/0242270 A1    Aug. 28, 2014

(51) Int. Cl.

| B05D 3/00 | (2006.01) |
|---|---|
| B32B 43/00 | (2006.01) |
| B05D 5/00 | (2006.01) |
| B05D 7/14 | (2006.01) |
| C08G 18/48 | (2006.01) |
| C08G 18/66 | (2006.01) |
| C08G 18/67 | (2006.01) |
| C08G 18/75 | (2006.01) |
| C08F 299/06 | (2006.01) |
| C09D 175/16 | (2006.01) |
| B05D 7/00 | (2006.01) |

(52) U.S. Cl.
CPC ........ *B05D 5/005* (2013.01); *B05D 7/14* (2013.01); *B05D 7/542* (2013.01); *C08F 299/065* (2013.01); *C08G 18/4854* (2013.01); *C08G 18/6692* (2013.01); *C08G 18/672* (2013.01); *C08G 18/755* (2013.01); *C09D 175/16* (2013.01)

(58) Field of Classification Search
CPC ............ C08G 18/672; C08G 18/4854; C08G 18/6692; B05D 7/14; B05D 5/005
USPC .................................................. 427/140, 142
See application file for complete search history.

(56) References Cited

U.S. PATENT DOCUMENTS

| 5,348,997 | A |  | 9/1994 | Kato et al. |
|---|---|---|---|---|
| 5,472,996 | A |  | 12/1995 | Hayashi et al. |
| 5,571,861 | A |  | 11/1996 | Klein et al. |
| 5,614,582 | A |  | 3/1997 | Hori et al. |
| 5,623,016 | A |  | 4/1997 | Klein et al. |
| 5,912,293 | A |  | 6/1999 | Stockwell et al. |
| 6,821,569 | B2 | * | 11/2004 | Okada et al. ........... 427/492 |
| 7,459,496 | B2 | * | 12/2008 | Hsu et al. ............... 524/439 |
| 7,531,074 | B2 | * | 5/2009 | Purdy et al. ............ 204/488 |
| 2005/0103278 | A1 |  | 8/2002 | Krajnkik et al |
| 2004/0159555 | A1 |  | 8/2004 | Purdy et al. |
| 2007/0048441 | A1 |  | 3/2007 | Braun et al. |
| 2007/0116866 | A1 | * | 5/2007 | Mich .................... 427/140 |
| 2011/0177352 | A1 |  | 7/2011 | Ambrose et al. |

FOREIGN PATENT DOCUMENTS

| CN | 101157749 | 4/2008 |
|---|---|---|
| EP | 2025694 A1 | 2/2009 |
| JP | 1995082456 A | 3/1995 |
| JP | 10-139839 | 5/1998 |
| WO | WO 97/47401 | 12/1997 |
| WO | WO 2011/127641 A1 | 10/2011 |
| WO | WO2013/181068 A2 | 12/2013 |

* cited by examiner

*Primary Examiner* — Michael Wieczorek
(74) *Attorney, Agent, or Firm* — Krisanne Shideler

(57) ABSTRACT

A method of repairing defects in automotive coatings is disclosed. More particularly, the invention relates to a method of repairing defects in color-clear composite coatings.

17 Claims, No Drawings

METHODS FOR REPAIRING DEFECTS IN AUTOMOTIVE COATINGS

FIELD OF THE INVENTION

The present invention relates to a method of repairing defects in automotive coatings. More particularly, the invention relates to a method of repairing defects in color-clear composite coatings.

BACKGROUND OF THE INVENTION

Commercial automotive coatings, that is, coatings for automobiles and trucks (motor vehicles), are typically so-called color-clear composite coatings comprising an opaque pigmented colored basecoat that is applied either to a cured electrodeposited primer layer or to a cured primer surfacer layer that has been previously applied over the electrodeposited primer layer. A transparent coating called a clearcoat is then applied to the basecoat. Such a composite coating has outstanding gloss and distinctness of image, that is, the ability to reflect an image in a sharp, well-defined manner.

For various reasons, the composite coating may have a defect that needs to be repaired before the motor vehicle leaves the factory. Typically, the repair is done on the assembly line shortly after the motor vehicle exits the assembly line.

Most of the basecoats that are used in automotive assembly contain an aminoplast curing agent and are deposited from an aqueous coating composition. These basecoats are typically used for the repair coating. The defect is removed from the damaged area, the basecoat applied, and a 2K clearcoat comprising a polymeric polyol, such as a (meth)acrylic polyol, and a polyisocyanate curing agent is applied to the uncured basecoat via a wet-on-wet process and the composite coating cured at about 140° C. 2K clearcoats are typically used in the repair coating even though they are not used as the original clearcoat in the painting process. This is because they are easy to apply, cure quickly and provide outstanding clearcoat properties in the damaged area. Although the 2K clearcoat composition can be cured at a temperature as low as 60° C., higher temperatures are used because the aminoplast curing agent in the basecoat does not cure well below 140° C.

For the basecoat that is used in the repair coating process, it would be desirable to have a coating composition that is aqueous and cures well at temperatures as low as 60° C., such that the 2K clearcoat can be applied wet-on-wet to the basecoat and the composite coating cured at temperatures as low as 60° C.

SUMMARY OF THE INVENTION

The present invention uses keto hydrazide chemistry in the repair basecoat composition. Accordingly, keto (also aldo) functionality and hydrazide functionality are co-reactive at ambient temperatures during a dehydration reaction resulting in complete cure when heated at temperatures as low as 60° C.

Accordingly, the invention provides for a method of repairing a defect in a multilayer coating comprising a color-imparting basecoat and transparent topcoat comprising:
(a) repairing the defect, and
(b) applying a basecoat composition to the repaired area to form a basecoat layer wherein the basecoat layer is formed by depositing a polyhydrazide-containing curable aqueous composition comprising:
(i) a continuous phase comprising water, and
(ii) a dispersed phase comprising:
(A) polymeric particles prepared from the polymerization of a mixture of ethylenically unsaturated monomer compounds, including ethylenically unsaturated monomers comprising:
(1) one or more multi-ethylenically unsaturated monomers and
(2) one or more keto or aldo group-containing ethylenically unsaturated monomers, and
(c) applying a transparent clearcoat composition to the basecoat layer to form a topcoat layer, and
(d) curing the basecoat layer and the topcoat layer simultaneously at a temperature of 60 to 100° C.

DETAILED DESCRIPTION

The repair of a factory-applied color-clear composite coating is typically done "on line" or shortly after the motor vehicle exists the assembly line. When inspection of the painted motor vehicle discovers a paint defect, the repair process shortly begins. The area of the defect is cleaned typically with an organic solvent such as alcohol or acetone, and the defect area masked off from the surrounding painted area. Light sanding with an emery cloth or fine sandpaper is done to remove the defect and the sanded area cleaned again with solvent. The aqueous basecoat composition is then applied to the repaired area, given a flash at ambient temperature and then a flash at 50-90° C. to dehydrate the basecoat, followed by a wet-on-wet application of the clearcoat and cured typically at 60 to 100° C., such as 70 to 90° C. All of this occurs before the motor vehicle leaves the factory.

The curable aqueous compositions that are useful in the method of the invention comprise a polyhydrazide-containing dispersion of polymeric particles in a continuous aqueous phase. The polymeric particles are prepared from the polymerization of a mixture of ethylenically unsaturated compounds including ethylenically unsaturated monomers that comprise at least one multi-ethylenically unsaturated monomer and at least one keto or aldo group containing ethylenically unsaturated monomer. The dispersion of polymeric particle can be made by conventional oil in water emulsion polymerization techniques typically to a solids content of 20 to 50 percent by weight. The polymerization can be conducted using conventional additives such as emulsifiers, protective colloids, free radical initiators and chain transfer agents. Generally, the polyhydrazide is added after the polymerization. The polymeric particles have a mean particle size (diameter) of from 40 to 250 nanometers.

The multi-ethylenically unsaturated monomers are typically diethylenically or triethylenically unsaturated monomers. Suitable monomers include divinyl aromatics such as divinyl benzene, diacrylates and dimethacrylates of $C_{2-24}$ dials such as butane did and hexane diol, divinyl ethylene urea and other divinyl ureas, and diallyl and triallyl compounds such as diallyl phthalate and triallyl isocyanurate. The amount of multi-ethylenically unsaturated monomers is 2 to 30 percent by weight based on total weight of ethylenically unsaturated monomer. The inclusion of such monomers causes crosslinking between the polymer backbones, which is important because such crosslinking allows the basecoat to hold out the subsequently applied clearcoat from stretching in to the basecoat adversely affecting appearance and physical properties. Amounts less than 2 percent by weight provide insufficient crosslinking, whereas amounts greater than 30 percent are undesirable because the composition becomes very viscous and difficult to process.

The aldo or keto group containing ethylenically unsaturated monomer is reactive with the polyhydrazide upon dehydration of the basecoat(s) resulting in a cured or crosslinked coating. Examples of such monomers include (meth)acrolein, diacetone(meth)acrylamide, acetoacetoxyethyl(meth)acrylate and vinyl acetoacetate. The aldo or keto group containing ethylenically unsaturated monomer is typically present in an amount of at least 30 percent by weight based on total weight of ethylenically unsaturated monomers. Amounts less than 30 percent are undesirable because of poor physical properties such as solvent resistance and humidity resistance. Typically, amounts greater than 60 percent by weight are not used because of the need to incorporate other ethylenically unsaturated monomers as described below to obtain the physical and chemical properties required for automotive quality coatings.

Besides the ethylenically unsaturated monomers mentioned above, alkyl esters of (meth)acrylic acid are usually used in the preparation of the polymeric particles. Typically, these monomers contain from at least 4, such as 4 to 10 carbon atoms, and at least 6, such as 6 to 10 carbon atoms in the alkyl group. These monomers are typically present in amounts of 4 to 40 percent by weight based on total weight of ethylenically unsaturated monomers. These monomers provide for low glass transition temperatures ($T_g$) in the cured basecoat layers, which is desirable because of road stone and chip resistance. $T_g$s less than 25° C. are desirable.

The $T_g$ can be measured on a cured film of the polymeric particles by Differential Scanning Colorimetry (rate of heating of 10° C./minute with the $T_g$ taken at the first inflection point). Examples of suitable monomers include isooctyl acrylate, 4 methyl-2 pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, including mixtures thereof.

Other ethylenically unsaturated monomers may also be used such as hydroxyalkyl esters of (meth)acrylic acid such as hydroxyethyl and hydroxypropyl(meth)acrylate; alkyl esters of (meth)acrylic acid having 1 to 2 carbon atoms in the alkyl group such as methyl(meth)acrylate; acid group containing monomers such as (meth)acrylic acid; and vinyl aromatic monomers such as styrene and vinyl toluene. Amounts of 0 to 60 percent are typical.

Besides the ethylenically unsaturated monomers, other ethylenically unsaturated compounds may be used. An example of such a compound is an ethylenically unsaturated polyurethane. These materials can be prepared by reaction of a polyisocyanate, usually a diisocyanate with a polyol, a polyol such as a dial containing carboxylic acid groups, optionally another polyol having a number average molecular weight of 60 to 10,000 and a hydroxyl group-containing ethylenically unsaturated monomer.

Among the polyisocyanates that may be used are aliphatic including cycloaliphatic diisocyanates such as tetramethylene diisocyanate, 2,2,4-trimethylhexane diisocyanate, hexamethylene diisocyanate, lysine diisocyanate, as well as alicyclic diisocyanates such as 1,4-cyclohexylene diisocyanate, 4,4'-dicyclohexylmethane diisocyanate, isophorone diisocyanate and the like.

As polyols, there may be used low molecular weight glycols, high molecular weight glycols, such as polyether polyols, and the like individually, or mixtures of high molecular weight glycols and low molecular weight glycols.

Examples of low molecular weight glycols are ethylene glycol, diethylene glycol, triethylene glycol, 1,2-propylene glycol, 1,3-butylene glycol, tetramethylene glycol, hexamethylene glycol, and the like, which may be used individually or in admixture.

Examples of high molecular weight polyglycols, are polyether glycols such as polyethylene glycol, polypropylene glycol, polytetramethylene glycol, and the like, and polyester glycols.

Examples of carboxylic add group-containing polyols, are 2,2-dimethylol propionic add, 2,2-dimethylol butyric add, 2,2-dimethylol valeric add, and the like. Typically, the carboxylic add group-containing polyols are present in amounts of 5 to 30 percent by weight based on weight of resin solids of the ethylenically unsaturated polyurethane. The add value of the ethylenically unsaturated polyurethane is typically about 20 to 60 based on resin solids of the ethylenically unsaturated polyurethane.

Examples of hydroxyl group-containing ethylenically unsaturated monomers are (meth)acrylates such as 2-hydroxyethyl(meth)acrylate, hydroxypropyl(meth)acrylate, hydroxybutyl(meth)acrylate, and the like.

Also, allyl compounds such as allyl alcohol may be used.

The synthesis reaction of the ethylenically unsaturated polyurethane resin may be carried out with one or more of the acrylic monomers such as 2-ethylhexyl(meth)acrylate acting as a reactive solvent. Also, an unreactive organic solvent that is inactive to the isocyanate group and which has high compatibility with water, such as dioxane, acetone, methyl ethyl ketone, methyl isobutyl ketone, N-methylpyrrolidone, tetrahydrofuran and the like may be used.

The proportions of the hydroxyl group-containing reactants may be changed variously but the equivalent ratio between isocyanate groups and hydroxyl groups in all components is from 1:1 to 1:1.5 such as 1:1 to 1:1.3. The amount of the hydroxyl group-containing ethylenically unsaturated monomer may be 0.01-1, usually 0.02-0.8 equivalent to 1 equivalent of isocyanate group.

Preparation of the ethylenically unsaturated polyurethane resin is not limited to any one method, and diisocyanate, a polyol, a carboxyl group-containing diol and a hydroxyl group-containing ethylenic unsaturated monomer may be reacted simultaneously, or the resin may be prepared by multi-step reaction method. In the latter case, a diisocyanate is reacted with a part of the polyol and a carboxyl group-containing dial to synthesize a prepolymer having the isocyanate end, and thereafter the remainder of the polyol and a hydroxyl group-containing ethylenic unsaturated monomer are reacted with the prepolymer. Generally, the reaction may be carried out at the temperature of 40-180° C., usually 60-130° C.

In order to accelerate the reaction, there may be used catalysts generally used in the conventional urethane reactions, such as triethylamine, N-ethyl morpholine, triethyldiamine and the like, as well as tin type catalysts such as dibutyl tin dilaurate, dioctyl tin dilaurate and the like. Furthermore, in order to prevent polymerization of an ethylenic unsaturated compound during the urethane reaction, there may be used hydroquinone, hydroquinone monomethyl ether, p-benzoquinone and the like.

For enhanced dispersion stability, the polymeric particles can contain an amine salt group. Typically, this can be incorporated into the particle by forming the amine salt of the acid associated with the ethylenically unsaturated polyurethane. The acid groups can be at least partially neutralized, i.e., at least 30 percent of the total neutralization equivalent, by an inorganic base such as sodium hydroxide or an amine, particularly a volatile amine. Examples of suitable amines are ammonia, dimethylamine, trimethylamine, monoethanolamine, and dimethylethanolamine. By carboxylic acid functionality is meant carboxylic acid as well as salts thereof.

The ethylenically unsaturated polyurethanes typically comprise from 30 to 60 percent by weight of the ethylenically unsaturated compounds used in the preparation of the polymeric particles and ethylenically unsaturated monomers comprise from 40 to 70 percent by weight of the ethylenically unsaturated compounds; the percentages by weight being based on total weight of the ethylenically unsaturated compounds.

A polyhydrazide that is a material containing two or more hydrazide groups is also present in the curable aqueous basecoat composition. The hydrazide group is very polar and usually the polyhydrazide will be in the aqueous phase. However, hydrophobic polyhydrazides may be in the dispersed phase. The polyhydrazides are reactive with the keto or aldo functionality present in the polymeric particles during dehydration of the basecoat(s) layer(s) to form a crosslinked coating. The polyhydrazide compounds suitable for this invention have two or more hydrazino groups (—NH—NH$_2$) per molecule which bind directly to the carbon atoms of the aldo or keto group. Examples of these are maleic dihydrazide, fumaric dihydrazide, itaconic dihydrazide, phthalic dihydrazide, isophthalic dihydrazide, terephthalic dihydrazide, trimellitic trihydrazide, oxalic dihydrazide, adipic dihydrazide and sebacic dihydrazide, and others. The polyhydrazide compound typically has between 1 to 10 carbon atoms with an equivalent ratio of hydrazide to aldo or ketone being from 0.5 to 1.5:1, permitting the coating composition to crosslink to form the highly crosslinked cured film. The polyhydrazide compound is usually present in an amount between about 0.1 weight percent to about 3.0 weight percent, based on the total weight of the curable aqueous composition.

Besides the polyhydrazide, the curable aqueous composition can contain a polycarbodiimide that is reactive with carboxylic acid functionality that is present in the polymer particle due to the carboxylic acid functionality present in the ethylenically unsaturated monomers, e.g., (meth)acrylic acid or carboxylic acid functionality present in the ethylenically unsaturated polyurethane, e.g., from the polyol containing carboxylic acid groups. As mentioned earlier, the carboxylic acid functionality is typically at least partially neutralized with a volatile amine that volatilizes during the formation of the basecoat layer exposing carboxylic acid groups that are reactive with the polycarbodiimides at ambient temperature. The equivalent ratio of polycarbodiimide to carboxylic acid is typically 0.5 to 1.5:1 and the polycarbodiimide when used is typically present in the coating composition in amounts of 1.5 to 25 percent by weight based on total weight of the curable aqueous composition. Examples of suitable polycarbodiimides are disclosed in US 2011/0070374 and are available from Nesshimbo Chemical Co. under the trademark CARBODILITE.

Besides the above components, the curable aqueous composition also contains color-imparting components such as organic and inorganic pigments, including color effect pigments such as aluminum flake and metal oxide coated micas. The pigments are typically present in the curable aqueous compositions such that the pigment to resin ratio is from 0.02 to 1.5:1 and usually the pigment is present in the composition in amounts of 2 to 70 percent by weight based on total weight of the composition.

Other optional ingredients such as dyes, wetting agents, defoamers, leveling agents, fillers, plasticizers, fungicides and solvents may also be present in the curable aqueous composition. These optional ingredients may be present in amounts up to 20 percent by weight based on total weight of the curable aqueous composition.

The aqueous curable composition can be formulated by blending the dispersion of the polymeric particles, the polyhydrazide (unless it has been previously incorporated with the other ingredients with low shear mixing). The composition is applied to the repaired area by conventional spraying techniques. The coated area is then given a 20-25° C. flash followed by application of the clear coating composition.

The clear coating composition comprises two components that are maintained as separate packages until immediately prior to use. One component (A) contains a polymeric polyol, typically a (meth)acrylic polyol, and the other component (B) contains a curing agent reactive with the hydroxyl groups in the first component, typically a polyisocyanate. The reaction product of components (A) and (B) comprises the primary film-forming portion of the coating composition. Optimized commercial embodiments of the coating composition may optionally include additional ingredients such as diluents (e.g., solvents and/or reactive resinous diluents), catalysts, ultraviolet light absorbers and stabilizers that are conventional in the art.

The (meth)acrylic polyol is made by addition polymerization of at least two types of ethylenically unsaturated monomers, at least one of which contains hydroxyl functionality. Other monomers are typically included to provide desired physical properties to the final coating.

Based on total resin solids weight of the monomer mixture, the acrylic polyol of the present invention may be synthesized from a monomer combination that comprises: (a) 5 to 45 weight percent hydroxy-containing unsaturated monomers such as hydroxyalkyl(meth)acrylates; and (b) from 55 to 95 weight percent of other ethylenically unsaturated copolymerizable materials such as non-functional alkyl(meth)acrylates, and vinyl aromatic monomers. The preferred weight percentages of these monomers are 20 to 40 percent of (a), and 60 to 80 percent of (b). The percentage by weight is based on total weight of ethylenically unsaturated monomer.

Examples of suitable hydroxy-containing unsaturated monomers of group (a) are hydroxyalkyl(meth)acrylates having 2 to 4 carbon atoms in the hydroxyalkyl group such as hydroxyethyl(meth)acrylate and hydroxypropyl(meth)acrylate.

Monomers of group (b) in the monomer mixture include a wide range of unsaturated compounds. Preferably the major portion of the group (b) monomers are vinyl monomers, more specifically alkyl, cycloalkyl, or aryl(meth)acrylates having 2 to 6 carbon atoms in the esterifying group. Examples of particularly useful monomers are methyl methacrylate and n-butyl methacrylate. Other monomers that may be considered useful include lauryl methacrylate, 2-ethylhexyl methacrylate, isobornyl methacrylate, and cyclohexyl methacrylate. An aromatic vinyl monomer frequently included is styrene. Other copolymerizable monomers which may optionally be included in the group (b) monomers are ethylenically unsaturated materials such as monoolefinic and diolefinic hydrocarbons, unsaturated esters of organic and inorganic acids, amides and esters of unsaturated acids, nitriles, and unsaturated acids. Examples of such monomers include 1,3-butadiene, acrylamide, acrylonitrile, alpha-methyl styrene, alpha-methyl chlorostyrene, vinyl butyrate, vinyl acetate, allyl chloride, divinyl benzene, diallyl itaconate, and triallyl cyanurate. It should be understood that monomer group (b) may include mixtures.

Besides the (meth)acrylic polyols, adjuvant resins such as polyesters can also be added to the clearcoat formulation. These polyesters are polyester polyols which are designed to be cured with the polyisocyanates. The polyesters are formed by the polyesterification of an organic polycarboxylic acid or its functional equivalent thereof with an organic polyol. Among the acids which can be used are phthalic acid, terephthalic acid, tetrahydrophthalic acid, hexa-hydrophthalic acid, azelaic acid and dimerized fatty acid including mixtures. Examples of suitable polyols are ethylene glycol, 1,4-butanediol, neopentyl glycol, trimethylpentanediol and trimethyloipropane including mixtures. Also, polycaprolactone-type polyesters may be employed which are formed from reaction of a cycle lactone such as epsilon-caprolactone with a polyol or a hydroxy acid such as ethylene glycol and dimethyloipropionic acid.

Examples of polyisocyanates that may be used in component (B) are aliphatic and cycloaliphatic polyisocyanates, including mixtures thereof. Typically, the polyisocyanate is a diisocyanate. Examples of suitable aliphatic diisocyanates include 1,4-tetramethylene diisocyanate and 1,5-hexamethylene diisocyanate. Examples of suitable cycloaliphatic diisocyanates include 1,4-cyclohexyl diisocyanate, isophorone diisocyanate, and 4,4'-methylene-bis-(cyclohexyl isocyanate). Isocyanurates and biurets of the diisocyanates described above can also be used.

The amounts of (meth)acrylic polyol and polyisocyanate curing agent which are used in the practice of the invention are preferably adjusted so that the equivalent ratio of isocyanate groups to hydroxyl groups is within the range of 0.8:1 to 1.5:1, preferably slightly greater than 1:1. Isocyanate to hydroxyl equivalent ratios greater than this ratio are not preferred because hardness and durability of the resultant coating may suffer; whereas ratios lower than this ratio are not preferred because flexibility of the resultant coating may suffer.

Typically included the clearcoat compositions are ultraviolet light stabilizers and ultraviolet light absorbers. Effective amounts of ultraviolet light stabilizers and absorbers are in the range of 0.01 to 5.0 percent by weight, preferably 1.5 to 2.5 percent by weight, the percentages based on the total weight of resin solids of the clearcoat composition. A variety of ultraviolet light stabilizers well known to those skilled in the art can be used. Especially useful are the UV stabilizers and absorbers commercially available under the name TINUVIN from Ciba Specialty Chemicals.

The clearcoat compositions usually include organic liquid diluent, typically in an amount of between 10 to 60 percent by weight of the total weight of the clear coating composition. Examples of suitable diluents include aromatic hydrocarbons such as toluene and xylene, ketones such as methyl ethyl ketone and methyl isobutyl ketone.

Metal catalysts are used in the coating compositions of present invention for facilitating the cure of compositions containing hydroxyl and isocyanate groups. Usually, the metal catalysts are formed from tin. Such metal catalysts are known in the art for accelerating the reaction of hydroxyl-containing organic molecules with isocyanates to form urethane groups. Representative of such catalysts are metal salts of carboxylic acids, diorganometallic oxides, mono- and diorganometallic carboxylates, and the like. Specific examples of such metal catalysts are dibutyl tin dilaurate, dibutyl tin diacetate, dibutyl tin octoate and dibutyl tin naphthanate. Such catalysts are used in curing polyisocyanate-polyol compositions in amounts typically from 0 to 0.10 percent by weight of the resin solids content of the clearcoat compositions.

EXAMPLES

Illustrating the invention are the following Examples that are not to be considered as limiting the invention to their details. All parts and percentages in the Examples as well as throughout the specification are by weight unless otherwise indicated.

Example A'

Polyurethane

A mixture containing a polyurethane acrylate prepolymer was prepared by adding 100 g of 29-ethylhexyl acrylate (EHA), 79.2 g of hydroxyethyl methacrylate, 81.6 g of dimethylol propionic acid, 1.5 g of 2,6-di-tert-butyl 4-methyl phenol, 0.8 g of triphenyl phosphite, 4 g triethyl amine and 0.8 g of dibutyl tin dilaurate to a four necked round bottom flask fitted with a thermocouple, mechanical stirrer, and condenser and heated to 90° C. to obtain a homogeneous solution. Then 405.5 g of polytetrahydrofuran molecular weight 1000 was added. To this mixture at 90° C., isophorone diisocyanate 225.4 g was added over 90 minutes. The isocyanate container was rinsed with 20.0 g of EHA. The reaction mixture was stirred at 90° C. until all the isocyanate groups were reacted. Then 454.0 g of EHA and 72.5 g of propylene glycol monomethyl ether was added and cooled to ambient temperature.

Example A

Polyurethane Acrylic Latex

For the purpose of control, a polyurethane acrylic latex with no keto ethylenically unsaturated monomer, and 5.5% multi-ethylenically unsaturated monomer was prepared as follows:

Ten (20.0) g of Aerosol OT-75 (surfactant from Cytec Industries), 14.0 g of dimethyl ethanolamine, 369 g of prepared polyurethane/EHA mixture of Example A', 14.5 g of 1,6-hexanediol diacrylate, 97.0 g methyl methacrylate and 711 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example B

A polyurethane acrylic latex containing 17.8 percent by weight diacetone acrylamide (DAAM) and 17.8 percent by weight acetoacetoxyethyl methacrylate (AAEM) and 5.5 percent by weight of 1,6-hexanediol diacrylate, the percentages by weight being based on total weight of ethylenically unsaturated monomers, was prepared as follows:

Ten (10.0) g of Aerosol OT-75 (surfactant from Cytec Industries), 7.0 g of Adeka Reasoap SR-10 (emulsifier from Adeka Corp.), 9.5 g of 28% ammonium hydroxide, 369 g of prepared polyurethane/EHA mixture of Example A, 13.7 g of 1,6-hexanediol diacrylate, 44.0 g of acetoacetoxyethyl methacrylate, 44.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS (biocide from Thor GmbH), 0.23 g of FOAMKILL 649 (defoamer from Crucible Chemical Co.) and 9.6 g of deionized water were charged into the flask and mixed for 15 minutes.

Example C

A polyurethane acrylic latex containing 32.7 percent by weight of DAAM and 5.1 percent by weight of 1,6-hexanediol diacrylate, the percentages by weight being based on total weight of ethylenically unsaturated monomers, was prepared as follows:

Ten (10.0) g of Aerosol OT-75, 7.0 g of Adeka Reasoap SR-10, 9.5 g of 28% ammonium hydroxide, 369 g of prepared polyurethane/EHA mixture (above example), 13.7 g of 1,6-hexanediol diacrylate, 88.0 g of diacetone acrylamide and 1245.4 g of deionized water were charged to a four necked round bottom flask fitted with a thermocouple, mechanical stirrer, and condenser and heated to 33° C. to obtain a homogeneous solution. 0.45 g of t-butylhydroperoxide and 18.6 g of deionized water was then charged into the flask and mixed for 10 minutes. After that, 0.009 g of ferrous ammonium sulfate, 0.45 g of sodium metabisulfite and 18.6 g of deionized water were charged over 30 minutes. During this charge, exotherm was expected. After peak exotherm, the system was held at 65° C. for 1 hour. After it cooled to 45° C., 4.3 g of acticide MBS, 0.23 g of FOAMKILL 649 and 9.6 g of deionized water were charged into the flask and mixed for 15 minutes.

Example D

Control

For the purpose of control, a polyurethane acrylic latex containing no keto group-containing monomer was prepared as follows:

Polyester Polyol

A mixture of 2000 g of 1,6-hexanediol, 200 g of maleic anhydride, 900 g of adipic acid and 1044 g of isophthalic acid was charged to a four necked flask with $N_2$ blanket. The mixture was then heated up to 180° C., and distillate was collected in graduated cylinder. During the process, the temperature was increased up to 225° C. step by step. The mixture was then held at 225° C. until acid value was less than 3 mg KOH/g.

Polyurethane Latex

A mixture of 1500 g of the polyester polyol, 32.3 g of 1,4-butanediol, 193.6 g of dimethylol propionic acid, 2.25 g of 2,6-di-tert-butyl 4-methyl phenol, 2.25 g of triphenyl phosphite and 58.4 g of triethyl amine was added to a four necked round bottom flask fitted with a thermocouple, mechanical stirrer, and condenser. The mixture was heated to 90° C. and mixed for an additional 30 minutes to obtain a homogeneous solution. The mixture was cooled down to 70° C., and 719 g of butyl acrylate (BA) was added to the flask. To this mixture at ~50° C., 863 g of isophorone diisocyanate was added over 20 minutes. The reaction mixture was held at 90° C. until all the isocyanate groups were reacted. Then the reaction mixture was dispersed into preheated (85° C.) mixture of 2372 g of deionized water and 36.6 g of dimethyl ethanolamine (DMEA) over 20 minutes. The mixture was mixed for an additional 30 minutes at 85° C. After that, the latex was cooled to ambient temperature.

Polyurethane Acrylic Latex 5259 g of the polyurethane latex was charged into a four necked round bottom flask and heated to 85° C. with $N_2$ blanket. 3109 g of deionized water was charged into the flask, and held at 80° C. for 5 minutes. A mixture of 2069 g of BA, 214 g of hydroxypropyl methacrylate and 214 g of ethylene glycol dimethacrylate (6.7 percent by weight based on total weight of ethylenically unsaturated monomer) was added to the flask over 30 minutes. After that, the mixture was held at 80° C. for an additional 30 minutes before cooled down to 30° C. A mixture of 51 g of deionized water, 0.034 g of ferrous ammonium sulfate, 1.7 g of sodium metabisulfite and 0.8 g of DMEA were charged. Then, mixture of 1.3 g of t-butylhydroperoxide and 127 g of deionized water was charged over 20 minutes. During this charge, a peak exotherm to ~80° C. was observed. The latex was then cooled down to 30° C., and a mixture of 102 g of deionized water, 0.068 g of ferrous ammonium sulfate, 3.4 g of sodium metabisulfite and 1.6 g of DMEA were charged. After that, mixture of 2.6 g of t-butylhydroperoxide and 255 g of deionized water was charged over 10 minutes and mixed for an additional 10 minutes. 22.9 g of DMEA was added, and then mixture of 7.9 g of deionized water and 11.3 g of Proxel GXL (biocide from Lonza Inc.) was added to the flask and mixed for 10 minutes.

Example E

A polyester was prepared according to Example 9 of U.S. Pat. No. 6,762,240. The polyester was dispersed in water to a solids of 20 percent before mixing with other paint components. Dimethyl ethanolamine was used as a neutralizing amine for the acidic groups during the dispersion.

Example F

An acrylic latex was prepared as follows:

A mixture of 1268 g of deionized water and 4.4 g of Rhodapex AB/20 (surfactant from Solvay-Rhodia) was charged into a four necked round bottom flask and heated to 85° C. with $N_2$ blanket. A mixture of 6.4 g of butyl acrylate, 19 g of methyl methacrylate and 0.6 g of methacrylic acid was then added into the flask, and the temperature was raised to 85° C. It was followed by the addition of 0.21 g of ammonium persulfate dissolved in 33 g of deionized water. The reaction mixture was held for 30 minutes. After that, a pre-emulsion with 753 g of deionized water, 9.7 g of Rhodapex AB/20, 473 g of methyl methacrylate, 190 g of butyl acrylate, 41.4 g of 50% acrylamide aqueous solution, 17.5 g of ethylene glycol dimethacrylate and 17.4 g of hydroxyethyl methacrylate was added into the flask over 3 hours, simultaneously with a mixture of 0.58 g of ammonium persulfate and 151 g of deionized water. After the completion of feeds, the reaction was held for 1 hour. A pre-emulsion with 95 g of deionized water, 1.4 g of Rhodapex AB/20, 39.5 g of butyl acrylate, 24.7 g of methacrylic acid, 18.1 g of methyl methacrylate, and 26.2 g of hydroxyethyl acrylate was added into the flask over 1.5 hours simultaneously with a mixture of 0.3 g ammonium persulfate, 0.95 g of granular borax and 116 g of deionized water. After the completion of the feeds, the product was held for 2 hours, followed by cooling to 70° C., and then adding mixture of 6.3 g of dimethyl ethanolamine dissolved in 39 g of deionized water over 20 minutes. Finally, 8.9 g of acticide (MBS) dissolved in 31 g of deionized water was added into the finished latex.

Example G

A polyester resin was prepared according to Example 1 of U.S. Pat. No. 6,291,564.

The following Examples show the preparation of various basecoat compositions prepared with polyhydrazide curing agents and polyurethane acrylic lattices of the invention in which the lattices were prepared with keto group ethylenically unsaturated monomers and multi-ethylenically unsaturated monomers. For comparative purposes, polyurethane acrylic lattices that were free of these monomers were also prepared. 2K (meth)acrylic polyol-polyisocyanate curing agents were applied and the composite coating cured. The coated panels were then sanded, the basecoat and clearcoat reapplied and given a low temperature (80-85° C.) cure. The lattices were deposited directly on cured electrodeposited coated panels.

Examples 1-3

Three (3) white basecoat compositions were prepared from the following mixture of ingredients:

| | Parts by weight of Component | | |
|---|---|---|---|
| Components | Example 1 (control) | Example 2 | Example 3 |
| Polyurethane-acrylic latex[1] | 126.83 | — | — |
| Polyurethane-acrylic latex w/ 17.8% DAAM + 17.8% AAEM/ADH[2] | — | 137.99 | — |
| Polyurethane-acrylic latex w/ 32.7% DAAM/ADH[3] | — | — | 170.48 |
| Urethane Diol[4] | 6.92 | 6.92 | 6.92 |
| Byk 348 surfactant[5] | 0.44 | 0.44 | 0.44 |
| Byk 032 defoamer[5] | 1.73 | 1.73 | 1.73 |
| P-1000E[6] | 5.06 | 5.06 | 5.06 |
| Resimene HM2608[7] | 22.20 | 22.20 | 22.20 |
| Deionized Water | 43.70 | 21.60 | 29.30 |
| Tinuvin 1130[8] | 2.60 | 2.60 | 2.60 |
| 50% DMEA[9] | 0.61 | 0.61 | 0.61 |
| White Tint[10] | 225.58 | 225.58 | 225.58 |
| Byketol WS surfactant[5] | 11.25 | 11.25 | 11.25 |
| Surfynol 104E[11] | 11.52 | 11.52 | 11.52 |
| TOTAL | 458.44 | 447.50 | 487.68 |

[1]Example A.
[2]Example B. Adipic dihydrazide (ADH) (3.1 g/100 g latex).
[3]Example C. Adipic dihydrazide (2.4 g/100 g latex).
[4]Polyurethane diol prepared by reacting 1 mole of Jeffamine D-400 (from Huntsman Chemical Co.) with 2 moles of ethylene carbonate at 130° C. See U.S. Pat. No. 7,288,595.
[5]Additives available from Byk Chemie.
[6]Polyglycol P-1000E commercially available from Dow Chemical.
[7]Melamine curing agent commercially available from INEOS Melamines.
[8]UV absorber commercially available from Ciba-Geigy AG.
[9]Dimethyl ethanolamine 50% aqueous solution.
[10]White tint paste consisting of 61% TiO$_2$ dispersed in 9% acrylic polymer blend and having a solids content of 70%.
[11]Surfactant commercially available from Air Products and Chemicals, Inc.

Each basecoat was spray applied in an environment controlled to 70-75° F. (21-24° C.) and 50-60% relative humidity onto 4 inch by 12 inch (10 cm by 30 cm) steel panels that were coated with PPG Electrocoat (ED 6060CZ) commercially available from PPG Industries, Inc. The substrate panels were obtained from ACT Test Panels, LLC of Hillsdale, Mich. The basecoats were applied in two coats, without a flash between coats, and then flashed at ambient temperature for 5 minutes and then dehydrated for 5 minutes at 185° F. (85° C.). The film thickness was approximately 1.2 mils (30 microns). A low bake 2K clearcoat commercially available from PPG Industries, Inc. as TKAP01000 was then applied over the basecoated panels in two coats without a flash between coats. The clearcoated panels were allowed to flash for 10 minutes at ambient conditions and baked for 30 minutes at 285° F. (140° C.). The film thickness was approximately 1.8 mils (45 microns).

For low bake repair, the panels were wet sanded with 1000 grit sand paper and then coated with the same original basecoat in two coats, without a flash between coats, and then dehydrated for 5 minutes at 180° F. (82° C.). The film thickness was approximately 1.2 mils (30 microns). 2K BASF low bake clearcoat commercially available from BASF as PROGLOSS LBR was then applied over the basecoated panels in two coats without a flash between coats. The clearcoated panels were allowed to flash for 10 minutes at ambient conditions and baked for 30 minutes at 176° F. (80° C.). The film thickness was approximately 1.9 mils (49 microns).

Appearance and physical properties were measured on the coated panels. Lower BYK Wavescan values and higher DOI values are more desirable for appearance. Higher Fischer Microhardness is a more desirable property.

Low Bake Repair (80° C.)—Vertical Panels—Appearance and Physical Properties

| | Fischer | BYK Wavescan[13] | | | DOI after Humidity Resistance[15] | |
|---|---|---|---|---|---|---|
| Example | Microhardness[12] | Long Wave | Short Wave | Initial DOI[14] | 1 hour Recovery | 24 hours Recovery |
| 1 | 60 | 18.8 | 6.8 | 87 | 77 | 87 |
| 2 | 73 | 12.0 | 4.6 | 89 | 92 | 93 |
| 3 | 83 | 9.7 | 4.3 | 92 | 92 | 92 |

[12]HM2000 Fischer Microhardness instrument manufactured by Fischer.
[13]BYK Wavescan instrument manufactured by BYK Gardner USA of Columbia, Maryland.
[14]Distinctness of Image (DOI) meter manufactured by TRICOR Systems, Inc. of Elgin, Illinois.
[15]Ten day humidity resistance test similar to ASTM D1735-92 conducted in a Harshaw Equipment GS "Uni-Fog" corrosion test cabinet set at 100° F. (38° C.) and 100% relative humidity. DOI measured after 1 hour and 24 hours recovery time after completion of test.

Examples 4 and 5

Two (2) grey basecoat compositions were prepared from the following mixture of ingredients:

| | Parts by weight of Component | |
|---|---|---|
| Components | Example 4 (Control) | Example 5 (with DAAM) |
| Urethane Acrylic Latex[17] | 125.48 | — |
| Polyurethane-acrylic latex w/ 32.7% DAAM/ADH[18] | — | 244.63 |
| Byk 348 | 0.32 | 0.32 |
| Byk 032 | 1.99 | 1.99 |
| Surfynol 104E | 4.20 | 4.20 |
| 50% DMEA | 0.37 | 0.37 |
| White Tint[19] | 102.92 | 102.92 |
| Black Tint[20] | 11.48 | 11.48 |
| Deionized Water | 39.89 | 18.74 |
| Odorless Mineral Spirits[21] | 3.00 | 3.00 |

-continued

| Components | Parts by weight of Component | |
|---|---|---|
| | Example 4 (Control) | Example 5 (with DAAM) |
| Urethane Diol | 10.67 | 10.67 |
| Resimene HM2608 | 14.22 | 5.56 |
| Cymel 1158[22] | 8.65 | — |
| Dowanol PnB[23] | 7.00 | 7.00 |
| 2-Ethylhexanol[24] | 3.00 | 3.00 |
| Byketol WS | 8.50 | 8.50 |
| TOTAL | 341.69 | 422.38 |

[17]Example D.
[18]Example C. Adipic dihydrazide (2.4 g/100 g latex).
[19]White tint paste consisting of 50% TiO$_2$ dispersed in 13% acrylic polymer blend and having a solids content of 61%.
[20]Black tint paste consisting of 7% carbon black dispersed in 16% acrylic polymer blend and having a solids content of 22%.
[21]Solvent available from Shell Chemical Co.
[22]Melamine formaldehyde curing agent available from Cytec Industries.
[23]Propylene glycol n-butyl ether available from Dow Chemical Co.
[24]Solvent available from Dow Chemical Co.

Examples 6 and 7

Two (2) silver basecoat compositions were prepared from the following mixture of ingredients:

| Components | Parts by weight of Component | |
|---|---|---|
| | Example 6 (Control) | Example 7 (with DAAM) |
| Polyester Latex[26] | 101.02 | 101.02 |
| Polyurethane-acrylic latex of Example A | 71.53 | — |
| Polyurethane-acrylic latex of Example C | — | 92.94 |
| Acrylic Latex[27] | 46.04 | 46.04 |
| 50% DMEA | 3.56 | 4.09 |
| Byk 348 | 0.24 | 0.24 |
| 2-Ethylhexanol | 12.57 | 12.57 |
| Odorless Mineral Spirits | 7.51 | 7.51 |
| Deionized Water | 149.82 | 167.99 |
| Dowanol PnB | 36.42 | 36.42 |
| Micronized TiO$_2$ Tint[28] | 1.34 | 1.34 |
| Black Tint[29] | 0.43 | 0.43 |
| Blue Tint[30] | 0.35 | 0.35 |
| White Tint | 0.02 | 0.02 |
| Laponite RD[31] | 1.81 | 1.81 |
| P-1000E | 2.50 | 2.50 |
| Resimene HM2608 | 34.50 | 34.50 |
| Polyester Resin[32] | 7.01 | 7.01 |
| Aluminum Paste[33] | 31.49 | 31.49 |
| Aluminum Passivator[34] | 11.25 | 11.25 |
| Acematt TS 100[35] | 1.58 | 1.58 |
| TOTAL | 520.99 | 561.10 |

[26]Example E.
[27]Example F.
[28]Micronized white tint paste consisting of 24% TIPAQUE TiO$_2$ commercially available from Ishiara Sangyo Kaisha dispersed in 17% acrylic polymer and having a solids content of 42%.
[29]Black tint paste consisting of 6% carbon black dispersed in 18% acrylic polymer and having a solids content of 24%.
[30]Blue tint paste consisting of 14% Palomar Blue commercially available from Sun Chemical dispersed in 22% acrylic polymer blend and having a solids content of 36%.
[31]Sodium lithium magnesium silicate available from Southern Clay Products.
[32]Example G.
[33]TSB 2180A aluminum paste available from Toyal America.
[34]Aluminum passivator.
[35]Silica commercially available from Evonik Degussa.

In the description below, Base1 were the basecoat compositions of Examples 4 and 5 and Base2 were the saver basecoat compositions of Examples 6 and 7. The basecoat of Example 6 was applied to the basecoat of Example 4, and the basecoat of Example 7 was applied to the basecoat of Example 5.

Each Base1 and Base2 was spray applied in an environment controlled to 70-75° F. (21-24° C.) and 50-60% relative humidity onto 4 inch by 12 inch (10 cm by 30 cm) steel panels that were coated with cured PPG Electrocoat (ED 6060CZ). The Base1 was applied in one coat and then flashed at ambient temperature for 5 minutes. The Base2 was then applied in two coats, without a flash between coats, and then flashed at ambient temperature for 5 minutes and then dehydrated for 5 minutes at 185° F. (85° C.). The film thicknesses of the Base1 and Base2 were approximately 0.8 mils (20 microns) and 0.5 mils (13 microns) respectively.

TKAPO1000 clearcoat of Examples 1-3 was then applied over the Base1/Base2 panels in two coats without a flash between coats. The clearcoated panels were allowed to flash for 10 minutes at ambient conditions and baked for 30 minutes at 185° F. (85° C.). The film thickness was approximately 1.8 mils (45 microns).

For low bake repair, the panels were wet sanded with 1000 grit sand paper and then coated with the same original Base2 in two coats, without a flash between coats, and then dehydrated for 5 minutes at 180° F. (82° C.). The film thickness was approximately 0.5 mils (13 microns). The 2K BASF low bake clearcoat of Examples 1-3 was then applied over the basecoated panels in two coats without a flash between coats. The clearcoated panels were allowed to flash for 10 minutes at ambient conditions and baked for 30 minutes at 176° F. (80° C.). The film thickness was approximately 1.8 mils (45 microns).

Appearance was measured on the coated panels before and after Water Soak Testing. Higher DOI values are more desirable for appearance.

Base1/Base 2—Appearance and Water Soak Testing

| Example | Initial DOI (OEM) | 2 Day Water Soak DOI[36] (OEM) | Initial DOI (Low Bake Repair) | 2 Day Water Soak DOI (Low Bake Repair) |
|---|---|---|---|---|
| Ex. 4/Ex. 6 (control) | 88 | 9 | 91 | 21 |
| Ex. 5/Ex. 7 | 87 | 49 | 93 | 50 |

[36]A 48 hour deionized water soak test where the entire panel is submerged at a water temperature of 63° C.

What is claimed is:

1. A method of repairing a defect in a multilayer coating applied to a motor vehicle at the end of an assembly process comprising a color-imparting basecoat and transparent topcoat comprising:
   (a) repairing the defect, and
   (b) applying a basecoat composition to the repaired area to form a basecoat layer wherein the basecoat layer is formed by depositing a polyhydrazide-containing curable aqueous composition comprising:
      (i) a continuous phase comprising water, and
      (ii) a dispersed phase comprising:
         (A) polymeric particles prepared from polymerization of a mixture of ethylenically unsaturated monomer compounds, including ethylenically unsaturated monomers comprising:
            (1) one or more multi-ethylenically unsaturated monomers
            (2) one or more aldo or keto group-containing ethylenically unsaturated monomers, and
            (3) one or more ethylenically unsaturated polyurethanes;

(c) applying a transparent clearcoat composition to the basecoat layer to form a topcoat layer, and (d) curing the basecoat layer and the topcoat layer simultaneously at a temperature of 60 to 100° C.

2. The method of claim 1 in which the repairing is done to a motor vehicle at the end of an assembly line.

3. The method of claim 1 in which the repairing of the defect is by sanding.

4. The method of claim 1 in which the basecoat layer is dehydrated at ambient temperature.

5. The method of claim 1 in which the ethylenically unsaturated polyurethanes are prepared from reacting an organic polyisocyanate with a polyol containing carboxylic acid functionality and a hydroxyalkyl(meth)acrylate such that the ethylenically unsaturated polyurethanes are free of NCO groups.

6. The method of claim 1 in which the basecoat layer has a $T_g$ less than 25° C. when cured.

7. The method of claim 1 in which the multi-ethylenically unsaturated monomers are present in amounts of 2 to 30 percent by weight based on total weight of the ethylenically unsaturated monomers.

8. The method of claim 1 in which the aldo or keto group-containing ethylenically unsaturated monomers are present in amounts of at least 30 percent by weight based on total weight of ethylenically unsaturated monomers.

9. The method of claim 1 in which the mixture of ethylenically unsaturated monomer compounds further comprises from 4 to 30 percent by weight of an alkyl ester of (meth) acrylic acid having at least 6 carbon atoms in the alkyl group; the percentage by weight being based on total weight of the ethylenically unsaturated monomers.

10. The method of claim 1 in which the ethylenically unsaturated polyurethanes are present in amounts of 30 to 60 percent by weight; the percentages by weight being based on total weight of the mixture of ethylenically unsaturated monomer compounds.

11. The method of claim 1 in which the polyhydrazide is a bishydrazide of a dicarboxylic acid having from 2 to 16 carbon atoms.

12. The method of claim 1 in which the equivalent ratio of hydrazide to aldo or keto is from 0.5 to 1.5:1.

13. The method of claim 1 in which the ethylenically unsaturated polyurethanes contain carboxylic acid functionality that is at least partially neutralized with an amine.

14. The method of claim 13 in which the amine is a volatile amine.

15. The method of claim 14 in which the polyhydrazide-containing curable aqueous composition additionally contains a polycarbodiimide.

16. The method of claim 15 in which the equivalent ratio of carbodiimide to carboxylic acid is from 0.5 to 1.5:1.

17. The method of claim 1 in which the transparent clearcoat composition comprises a polymeric polyol and a polyisocyanate curing agent.

* * * * *